(12) United States Patent  
Beal et al.

(10) Patent No.: US 7,692,685 B2
(45) Date of Patent: *Apr. 6, 2010

(54) SPEAKER DETECTION AND TRACKING USING AUDIOVISUAL DATA

(75) Inventors: Matthew James Beal, Belsize Park (GB); Nebojsa Jojic, Redmond, WA (US); Hagai Attias, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

This patent is subject to a terminal disclaimer.

(21) Appl. No.: 11/094,922

(22) Filed: Mar. 31, 2005

(65) Prior Publication Data

US 2005/0171971 A1   Aug. 4, 2005

Related U.S. Application Data

(63) Continuation of application No. 10/183,575, filed on Jun. 27, 2002, now Pat. No. 6,940,540.

(51) Int. Cl.
H04N 2/225 (2006.01)
(52) U.S. Cl. ...................................... 348/169
(58) Field of Classification Search .............. 348/14.07, 348/152–169, 170, 14.09; 382/100, 116, 382/103, 228; 706/10; 381/94.1
See application file for complete search history.

(56) References Cited

U.S. PATENT DOCUMENTS

| 5,778,082 | A | * | 7/1998 | Chu et al. | 381/92 |
|---|---|---|---|---|---|
| 6,005,610 | A | * | 12/1999 | Pingali | 348/169 |
| 6,014,167 | A | * | 1/2000 | Suito et al. | 348/169 |
| 6,092,058 | A | * | 7/2000 | Smyth | 706/10 |
| 6,115,480 | A | * | 9/2000 | Washizawa | 382/103 |
| 6,185,309 | B1 | * | 2/2001 | Attias | 381/94.1 |
| 6,195,122 | B1 | * | 2/2001 | Vincent | 348/169 |
| 6,226,409 | B1 | * | 5/2001 | Cham et al. | 382/228 |
| 6,266,638 | B1 | * | 7/2001 | Stylianou | 704/266 |
| 6,275,258 | B1 | * | 8/2001 | Chim | 348/211.12 |
| 6,314,204 | B1 | * | 11/2001 | Cham et al. | 382/228 |
| 6,552,963 | B2 | * | 4/2003 | Baranek et al. | 367/136 |
| 6,567,775 | B1 | * | 5/2003 | Maali et al. | 704/231 |
| 6,593,956 | B1 | * | 7/2003 | Potts et al. | 348/14.09 |
| 6,760,782 | B1 | | 7/2004 | Swales | |
| 6,766,035 | B1 | * | 7/2004 | Gutta | 382/103 |

(Continued)

FOREIGN PATENT DOCUMENTS

EP   1414216   4/2004

OTHER PUBLICATIONS

H. Attias, et al., "Blind Source Separation and Deconvolution: The Dynamic Component Analysis Algorithm", Neural Computation, 1998, 1373-1424, vol. 10.

(Continued)

Primary Examiner—Tung Vo
(74) Attorney, Agent, or Firm—Lee & Hayes, PLLC

(57) ABSTRACT

A system and method facilitating object tracking is provided. The invention includes an audio model that receives at least two audio input signals and a video model that receives a video input. The audio model and the video model employ probabilistic generative models which are combined to facilitate object tracking. Expectation maximization can be employed to modify trainable parameters of the audio model and the video model.

18 Claims, 10 Drawing Sheets

U.S. PATENT DOCUMENTS

| | | | |
|---|---|---|---|
| 6,795,794 B2 | 9/2004 | Anastasio et al. | |
| 6,801,656 B1* | 10/2004 | Colmenarez et al. | 382/159 |
| 6,829,017 B2* | 12/2004 | Phillips | 348/738 |
| 6,901,362 B1* | 5/2005 | Jiang et al. | 704/214 |
| 2002/0093591 A1* | 7/2002 | Gong et al. | 348/515 |
| 2002/0101505 A1* | 8/2002 | Gutta et al. | 348/14.07 |
| 2003/0167148 A1* | 9/2003 | Anastasio et al. | 702/181 |
| 2003/0208448 A1 | 11/2003 | Perry et al. | |

OTHER PUBLICATIONS

H. Attias, et al. "A New Method for Speech Denoising and Robust Speech Recognition Using Probabilistic Models for Clean Speech and for Noise", In Proceedings Eurospeech, 2001, 4 pages.

M. S. Brandstein, "Time-delay estimation of reverberant speech exploiting harmonic structure", Journal of the Accoustic Society of America, May 1999, 2914-2919, vol. 105, No. 5.

C. Bregler, et al., "Eigenlips for Robust Speech Recognition", Proceedings ICASSP, 1994, 4 pages.

B. Frey, et al., "Estimating Mixture Models of Images and Inferring Spatial Transformations Using the EM Algorithm", Proceedings of IEEE Conference on Computer Vision and Pattern Recognition, Jun. 1999, 7 pages.

B. Frey, et al., "Fast, large-scale transformation-invariant clustering", Proceedings of Neural Information Processing Systems, Dec. 2001, 7 pages.

N. Jojic, et al., "Learning Flexible Sprites in Video Layers", Proceedings of IEEE Conf. On Computer Vision and Pattern Recognition, 2001, 8 pages, Maui, HI.

J. Vermaak, et al., "Sequential Monte-Carlo Fusion of Sound and Vision for Speaker Tracking", Proceedings IEEE Intl. Conf. on Computer Vision, 2001, 6 pages.

H. Wang, et al., "Voice Source Localization for Automatic Camera Pointing System in Videoconferencing", Proceedings ICASSP, 1997, 187-190.

M.J. Beal, et al., "Audio-Video Sensor Fusion with Probabilistic Graphical Models", Proceedings of the 7th European Conference on Computer Vision (Lecture Notes in Computer Science), 2002, 15 pages.

M.J. Beal, et al., "A Self-calibrating Algorithm for Speaker Tracking Based on Audio-Visual Statistical Models", Accepted for Lecture Presentation at the International Conference on Acoustics, Speech, and Signal Processing, May 2002, 4 pages.

M.I. Jordan, "Learning in Graphical Models", MIT Press, 1998, Cambridge, MA. pt. 1, 100 pages (front cover-88).

M.I. Jordan, "Learning in Graphical Models", MIT Press, 1998, Cambridge, MA. pt. 2, 100 pages (89-188).

M.I. Jordan, "Learning in Graphical Models", MIT Press, 1998, Cambridge, MA. pt. 3, 100 pages (189-288).

M.I. Jordan, "Learning in Graphical Models", MIT Press, 1998, Cambridge, MA. pt. 4, 100 pages (289-388).

M.I. Jordan, "Learning in Graphical Models", MIT Press, 1998, Cambridge, MA. pt. 5, 100 pages (389-488).

M.I. Jordan, "Learning in Graphical Models", MIT Press, 1998, Cambridge, MA. pt. 6, 100 pages (489-588).

M.I. Jordan, "Learning in Graphical Models", MIT Press, 1998, Cambridge, MA. pt. 7, 52 pages (589-back cover).

International Search Report dated Sep. 11, 2006, mailed Sep. 19, 2006 for PCT Application Serial No. SG200506168-4; 4 pages.

\* cited by examiner

OBJECT AT POSITION I

SPEAKER DETECTION AND TRACKING USING AUDIOVISUAL DATA

CROSS-REFERENCE TO RELATED APPLICATIONS

This application is a continuation application of U.S. patent application Ser. No. 10/183,575, and entitled "SPEAKER DETECTION AND TRACKING USING AUDIOVISUAL DATA," filed on Jun. 27, 2002. The entirety of the aforementioned application is incorporated herein by reference.

TECHNICAL FIELD

The present invention relates generally to object (speaker) detection and tracking, and, more particularly to a system and method for object (speaker) detection and tracking using audiovisual data.

BACKGROUND OF THE INVENTION

Video conferencing has become increasingly effective in order to facilitate discussion among physically remote participants. A video input device, such as a camera, generally provides the video input signal portion of a video conference. Many conventional systems employ an operator to manually operate (e.g., move) the video input device.

Other systems employ a tracking system to facilitate tracking of speakers. However, in many conventional system(s) that process digital media, audio and video data are generally treated separately. Such systems usually have subsystems that are specialized for the different modalities and are optimized for each modality separately. Combining the two modalities is performed at a higher level. This process generally requires scenario dependent treatment, including precise and often manual calibration.

A tracker using only video data may mistake the background for the object or lose the object altogether due to occlusion. Further, a tracker using only audio data can lose the object as it stops emitting sound or is masked by background noise.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for an object tracker system having an audio model, a video model and an audio video tracker. For example, the system can be used to track a human speaker.

The object tracker system employs modeling and processing multimedia data to facilitate object tracking based on graphical models that combine audio and video variables. The object tracker system can utilize an algorithm for tracking a moving object, for example, in a cluttered, noisy scene using at least two audio input signals (e.g., from microphones) and a video input signal (e.g., from a camera). The object tracker system utilizes unobserved (hidden) variables to describe the observed data in terms of the process that generates them. The object tracker system is therefore able to capture and exploit the statistical structure of the audio and video data separately as well as their mutual dependencies. Parameters of the system can be learned from data, for example, via an expectation maximization (EM) algorithm, and automatic calibration is performed as part of this procedure. Tracking can be done by Bayesian inference of the object location from the observed data.

The object tracker system uses probabilistic generative models (also termed graphical models) to describe the observed data (e.g., audio input signals and video input signal).

The object's original audio signal and a time delay between observed audio signals are unobserved variables in the audio model. Similarly, a video input signal is generated by the object's original image, which is shifted as the object's spatial location changes. Thus, the object's original image and location are also unobserved variables in the video model. The presence of unobserved variables is typical of probabilistic generative models and constitutes one source of their power and flexibility. The time delay between the audio signals can be reflective of the object's position.

The object tracker system combines the audio model and the video model in a principled manner using a single probabilistic model. Probabilistic generative models have several important advantages. First, since they explicitly model the actual sources of variability in the problem, such as object appearance and background noise, the resulting algorithm turns out to be quite robust. Second, using a probabilistic framework leads to a solution by an estimation algorithm that is Bayes-optimal. Third, parameter estimation and object tracking can both be performed efficiently using the expectation maximization (EM) algorithm.

Within the probabilistic modeling framework, the problem of calibration becomes the problem of estimating the parametric dependence of the time delay on the object position. The object tracker system estimates these parameters as part of the EM algorithm and thus no special treatment is required. Hence, the object tracker system does not need prior calibration and/or manual initialization (e.g., defining the templates or the contours of the object to be tracked, knowledge of microphone based line, camera focal length and/or various threshold(s) used in visual feature extraction) as with conventional systems.

The audio model receives at least two audio signal inputs and models a speech signal of an object, a time delay between the audio input signals and a variability component of the original audio signal. The video model models a location of the object, an original image of the object and a variability component of the original image. The audio video tracker links the time delay between the audio signals of the audio model to the spatial location of the object's image of the video model. Further, the audio video tracker provides an output associated with the location of the object.

The audio video tracker thus fuses the audio model and the video model into a single probabilistic graphical model. The audio video tracker can exploit the fact that the relative time delay between the microphone signals is related to the object position.

The parameters of the object tracker system can be trained using, for example, variational method(s). In one implementation, an expectation maximization (EM) algorithm is employed. The E-step of an iteration updates the posterior distribution over the unobserved variables conditioned on the data. The M-step of an iteration updates parameter estimates.

Tracking of the object tracker system is performed as part of the E-step. The object tracker system can provide an output associated with the most likely object position. Further, the object tracker system can be employed, for example, in a video conferencing system and/or a multi-media processing system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
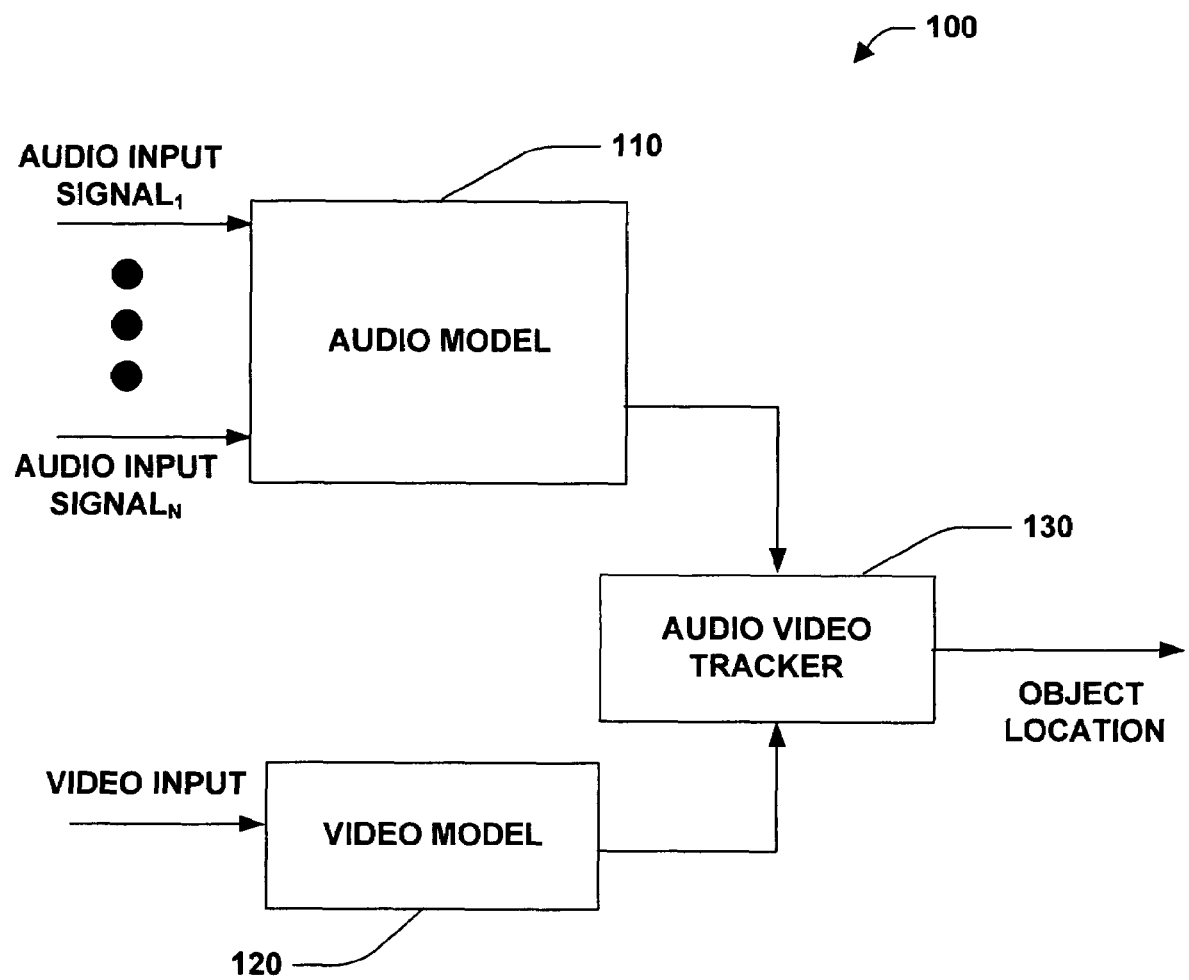
FIG. 1 is a block diagram of an object tracker system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, an object tracker system 100 in accordance with an aspect of the present invention is illustrated.

The system 100 includes an audio model 110, a video model 120 and an audio video tracker 130. For example, the object can be a human speaker.

The object tracker system 100 employs modeling and processing multimedia data to facilitate object tracking based on graphical models that combine audio and video variables. The object tracker system 100 can utilize an algorithm for tracking a moving object, for example, in a cluttered, noisy scene using at least two audio input signals (e.g., from microphones) and a video input signal (e.g., from a camera). The object tracker system 100 utilizes unobserved variables to describe the observed data in terms of the process that generates them. The object tracker system 100 is therefore able to capture and exploit the statistical structure of the audio and video data separately as well as their mutual dependencies. Parameters of the system 100 can be learned from data, for example, via an expectation maximization (EM) algorithm, and automatic calibration is performed as part of this procedure. Tracking can be done by Bayesian inference of the object location from the observed data.

The object tracker system 100 uses probabilistic generative models (also termed graphical models) to describe the observed data (e.g., audio input signals and video input signal). The models are termed generative, since they describe the observed data in terms of the process that generated them, using additional variables that are not observable. The models are termed probabilistic, because rather than describing signals, they describe probability distributions over signals. These two properties combine to create flexible and powerful models. The models are also termed graphical since they have a useful graphical representation.

Figure 2:
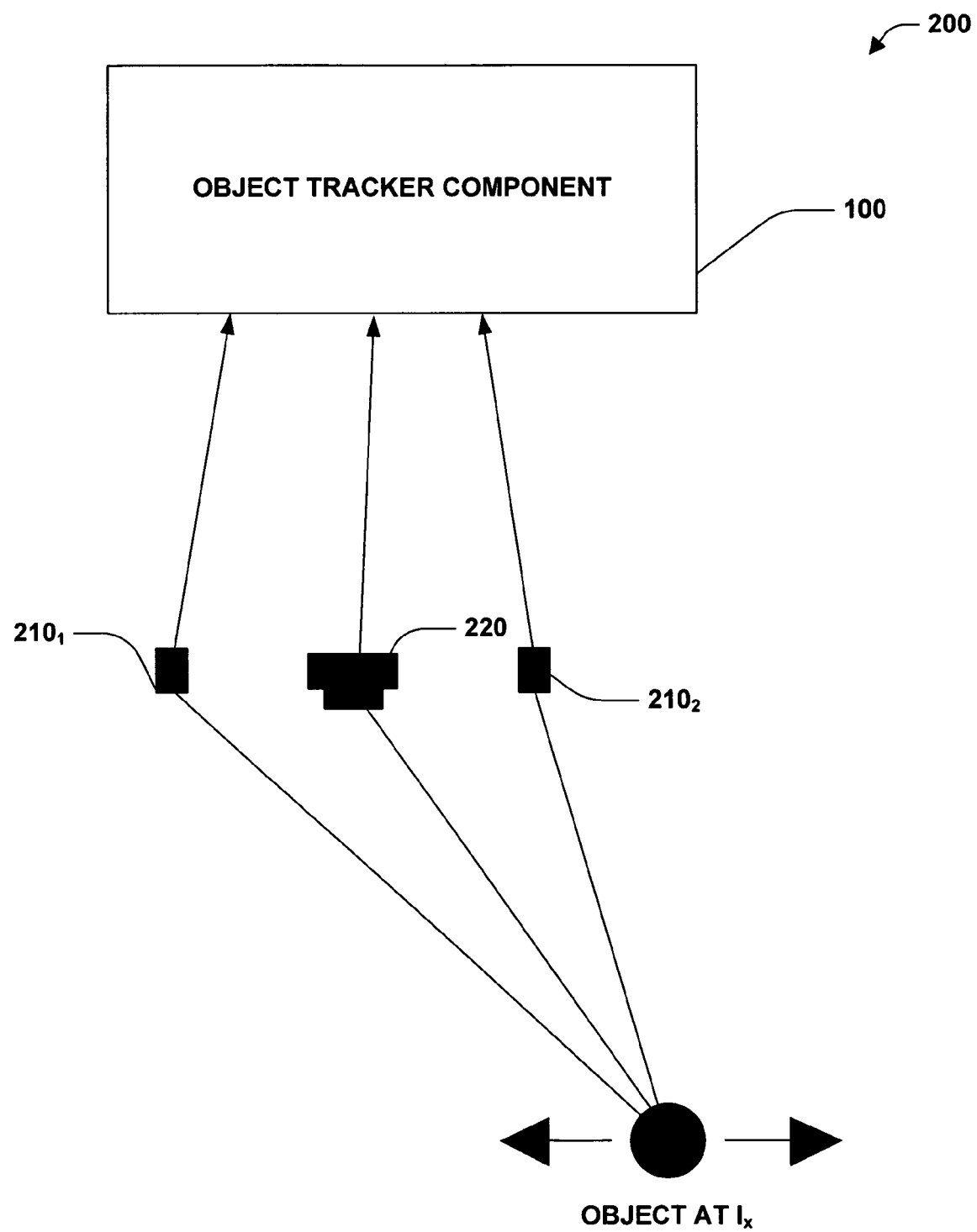
FIG. 2 is a block diagram of an object tracker system in accordance with an aspect of the present invention.

Turning briefly to FIG. 2, an object tracker system 200 in accordance with an aspect of the present invention is illustrated. The system 200 includes an object tracker system 100, a first audio input device $210_1$, a second audio input device $210_2$ and a video input device 220. For example, the first audio input device $210_1$ and the second audio input device $210_2$ can be microphones and the video input device 220 can be a camera.

The observed audio signals are generated by, for example, an object's original audio signal, which arrives at the second audio input device $210_2$ with a time delay relative to the first audio input device $210_1$. The object's original signal and the time delay are unobserved variables in the audio model 110. Similarly, a video input signal is generated by the object's original image, which is shifted as the object's spatial location changes. Thus, the object's original image and location are also unobserved variables in the video model 120. The presence of unobserved (hidden) variables is typical of probabilistic generative models and constitutes one source of their power and flexibility.

The time delay between the audio signals captured by the first audio input device $210_1$ and the second audio input device $220_2$ is reflective of the object's horizontal position $l_x$.

Figure 3:
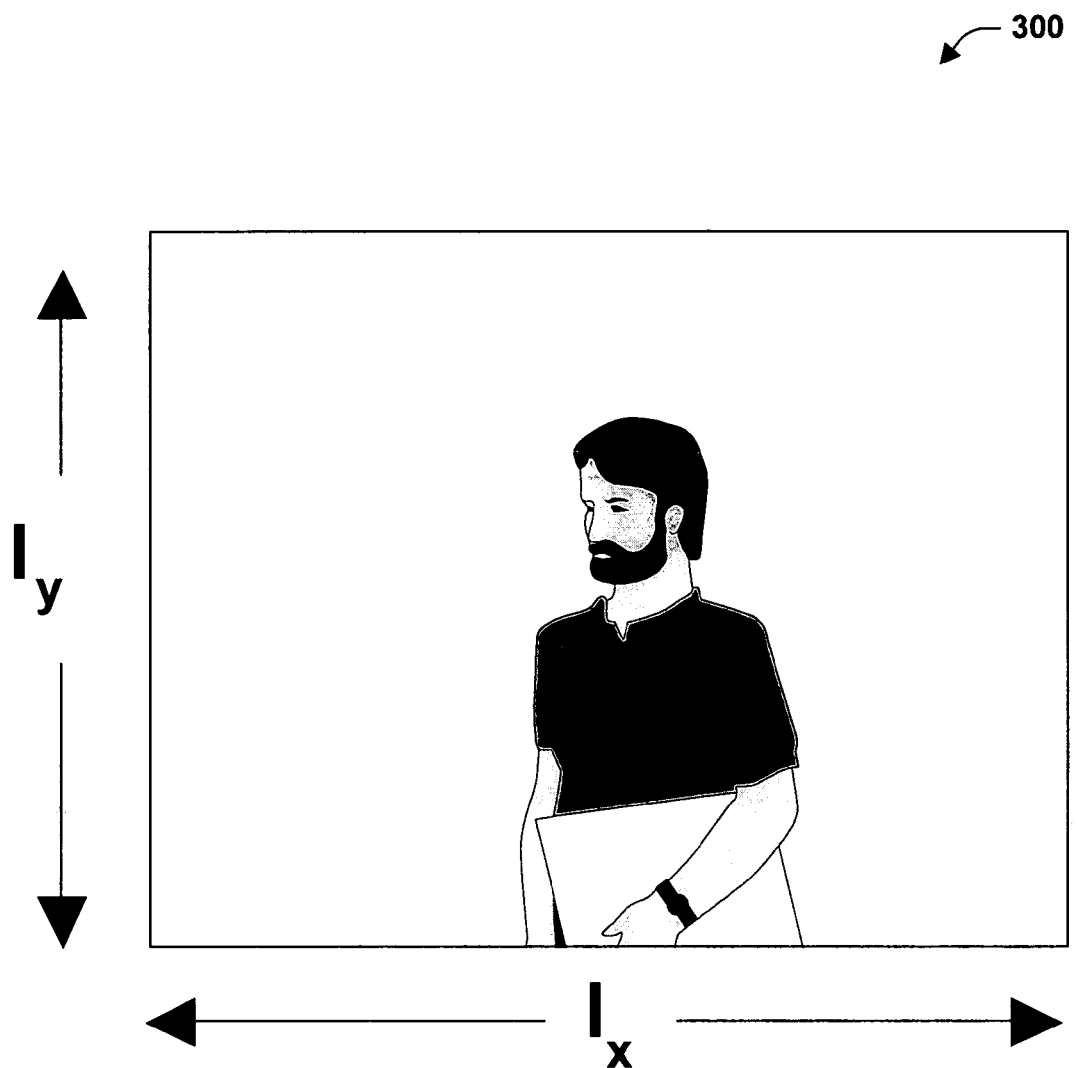
FIG. 3 is a diagram illustrating horizontal and vertical position of an object in accordance with an aspect of the present invention.

Referring briefly to FIG. 3, a diagram illustrating horizontal and vertical position of an object in accordance with an aspect of the present invention is illustrated. The object has a horizontal position $l_x$ and a vertical position $l_y$, collectively referred to as location l.

Turning back to FIG. 1, the object tracker system 100 combines the audio model 110 and the video model 120 in a principled manner using a single probabilistic model. Probabilistic generative models have several important advantages. First, since they explicitly model the actual sources of variability in the problem, such as object appearance and background noise, the resulting algorithm turns out to be quite robust. Second, using a probabilistic framework leads to a solution by an estimation algorithm that is Bayes-optimal. Third, parameter estimation and object tracking can both be performed efficiently using the expectation maximization (EM) algorithm.

Within the probabilistic modeling framework, the problem of calibration becomes the problem of estimating the parametric dependence of the time delay on the object position. The object tracker system 100 estimates these parameters as part of the EM algorithm and thus no special treatment is required. Hence, the object tracker system 100 does not need prior calibration and/or manual initialization (e.g., defining the templates or the contours of the object to be tracked, knowledge of microphone based line, camera focal length and/or various threshold(s) used in visual feature extraction) as with conventional systems.

The audio model 110 receives a first audio input signal through an Nth audio input signal, N being an integer greater than or equal to two, hereinafter referred to collectively as the audio input signals. The audio input signals are represented by a sound pressure waveform at each microphone for each frame. For purposes of discussion, two audio input signals will be employed; however, it is to be appreciated that any suitable quantity of audio input signals suitable for carrying out the present invention can be employed and are intended to fall within the scope of the hereto appended claims.

The audio model 110 models a speech signal of an object, a time delay between the audio input signals and a variability component of the original audio signal. For example, the audio model 110 can employ a hidden Markov model. The audio model 110 models audio input signals $x_1$, $x_2$ as follows. First, each audio input signal is chopped into equal length segments termed frames. For example, the frame length can be determined by the frame rate of the video. Hence, 30 video frames per second translates into $\frac{1}{30}$ second long audio frames. Each audio frame is a vector with entries $x_{1n}$, $x_{2n}$ corresponding to the audio input signal values at time point n. The audio model 110 can be trained online (e.g., from available audio data) and/or offline using pre-collected data. For example, the audio model 110 can be trained offline using clean speech data from another source (e.g., not contemporaneous with object tracking).

$x_1$, $x_2$ are described in terms of an original audio signal a. It is assumed that a is attenuated by a factor $\lambda_i$ on its way to audio input device i=1, 2, and that it is received at the second audio input device with a delay of $\tau$ time points relative to the first audio input device:

$$x_{1n} = \lambda_1 a_n,$$

$$x_{2n} = \lambda_2 a_{n-\tau} \quad (1)$$

It can further be assumed that a is contaminated by additive sensor noise with precision matrices $v_1$, $v_2$. To account for the variability of that signal, it is described by a mixture model. Denoting the component label by r, each component has mean zero, a precision matrix $\eta_r$, and a prior probability $\pi_r$. Viewing it in the frequency domain, the precision matrix corresponds to the inverse of the spectral template for each component, thus:

$$p(r) = \pi_r,$$

$$p(a|r) = N(a|0, \eta_r),$$

$$p(x_1|a) = N(x_1|\lambda_1 a, v_1),$$

$$p(x_2|a,\tau) = N(x_2|\lambda_2 L_\tau a, v_2), \quad (2)$$

where $L_\tau$ denotes the temporal shift operator (e.g., $(L_\tau a)_n = a_{n-\tau}$). The prior probability for a delay $\tau$ is assumed flat, $p(\tau)$ =const. $N(x|\mu, v)$ denotes a Gaussian distribution over the random vector x with mean $\mu$ and precision matrix (defined as the inverse covariance matrix) v:

$$\mathcal{N}(x \mid \mu, v) \propto \exp\left[-\frac{1}{2}(x-\mu)^T v(x-\mu)\right] \quad (3)$$

Figure 4:
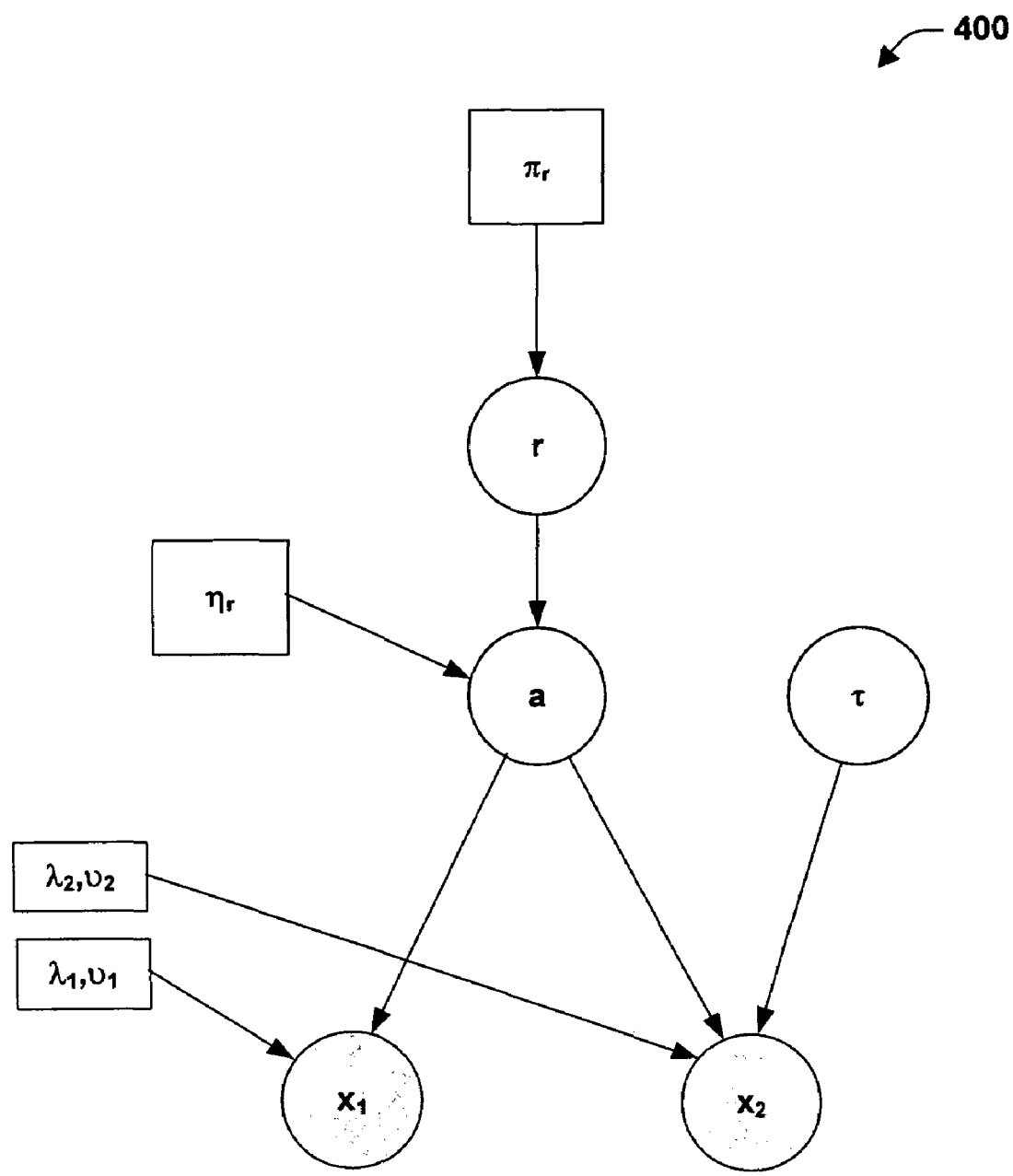
FIG. 4 is a graphical representation of an audio model in accordance with an aspect of the present invention.

Referring briefly to FIG. 4, a graphical representation 400 of the audio model 110 in accordance with an aspect of the present invention is illustrated. The graphical representation 400 includes nodes and edges. The nodes include observed variables (illustrated as shaded circles), unobserved variables (illustrated as unshaded circles) and model parameters (illustrated as square boxes). The edges (directed arrow) correspond to a probabilistic conditional dependence of the nose at the arrow's head on the node at tail.

A probabilistic graphical model has a generative interpretation: according to the graphical representation 400, the process of generating the observed microphone signals starts with picking a spectral component r with probability p(r), followed by drawing a signal a from the Gaussian p(a|r). Separately, a time delay $\tau$ is also picked. The signals $x_1$, $x_2$ are then drawn from the undelayed Gaussian $p(x_1|a)$ and the delayed Gaussian $p(x_2|a, \tau)$, respectively.

Turning back to FIG. 1, the video model 120 models a location of the object ($l_x$, $l_y$), an original image of the object (v) and a variability component of the original image (s). For example the video model 120 can employ a hidden Markov model. The video model 120 can be trained online (e.g., from available video data) and/or offline using pre-collected data.

The video input can be represented by a vector of pixel intensities for each frame. An observed frame is denoted by y, which is a vector with entries $y_n$ corresponding to the intensity of pixel n. This vector is described in terms of an original image v that has been shifted by $l=(l_x, l_y)$ pixels in the x and y directions, respectively, $$y_n = v_{n-l}, \quad (4)$$

and has been further contaminated by additive noise with precision matrix $\psi$. To account for the variability in the original image, v is modeled by a mixture model. Denoting its component label by s, each component is a Gaussian with mean $\mu_s$ and precision matrix $\phi_s$, and has a prior probability $\pi_s$. The means serve as image templates. Hence:

$$p(s) = \pi_s,$$

$$p(v|s) = N(v|\mu_s, \phi_s),$$

$$p(y|v,l) = N(y|G_l v, \psi), \quad (5)$$

where $G_l$ denotes the shift operator (e.g., $(G_l v)_n = v_{n-l}$). The prior probability for a shift l is assumed flat, p(l)=const.

Figure 5:
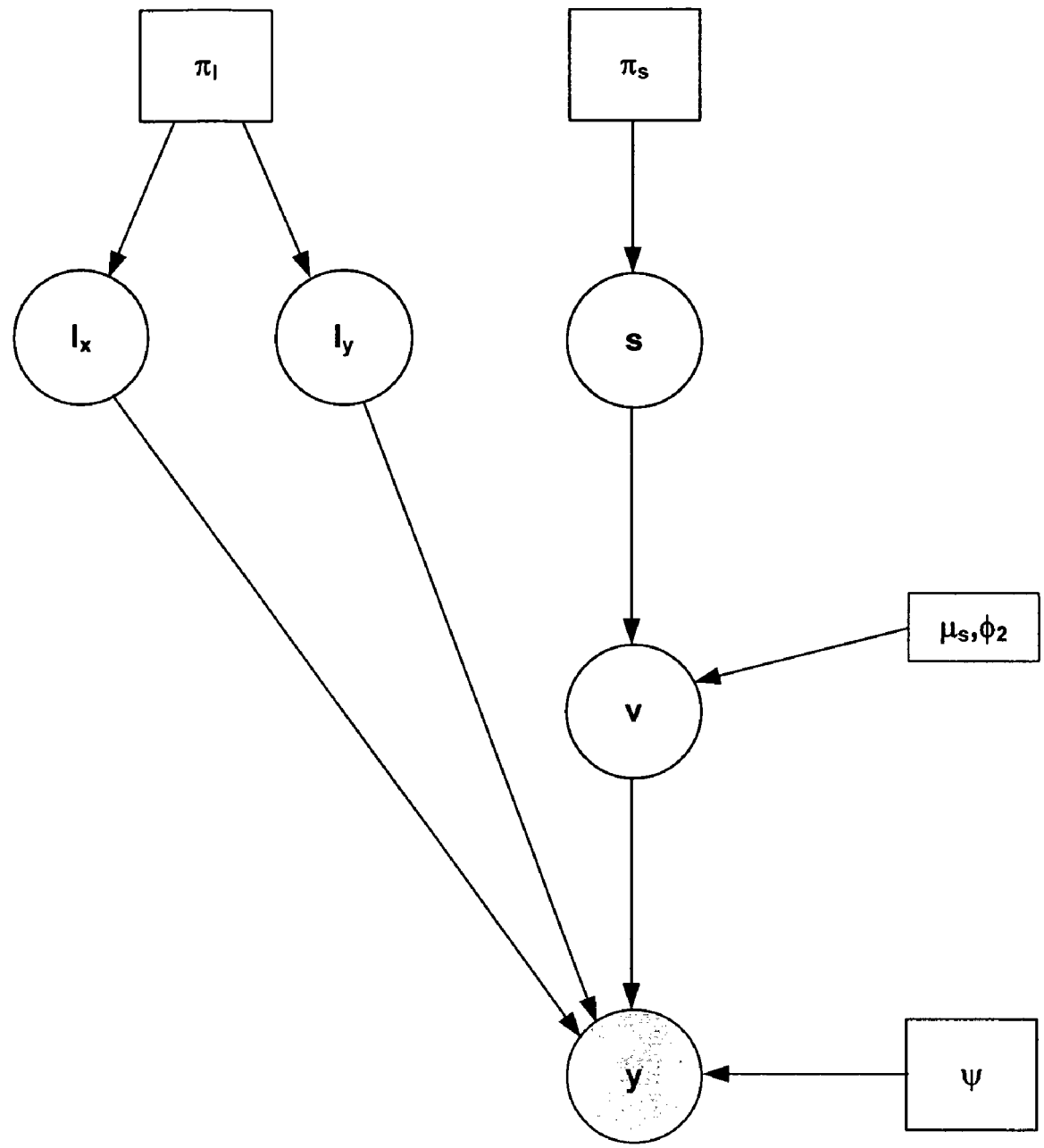
FIG. 5 is a graphical representation of a video model in accordance with an aspect of the present invention.

Referring briefly to FIG. 5, a graphical representation 500 of the video model 120 in accordance with an aspect of the present invention is illustrated. The graphical representation 500 includes nodes and edges. The nodes include observed variables (illustrated as shaded circles), unobserved variables (illustrated as unshaded circles) and model parameters (illustrated as square boxes).

The graphical representation 500 has a generative interpretation. The process of generating the observed image starts with picking an appearance component s from the distribution $p(s) = \pi_s$, followed by drawing an image v from the Gaussian p(v|s). The image is represented as a vector of pixel intensities, where the elements of the diagonal precision matrix define the level of confidence in those intensities. Separately, a discrete shift l is picked. The image y is then drawn from the shifted Gaussian p(y|v, l).

Notice the symmetry between the audio model 110 and video model 120. In each model, the original signal is hidden and described by a mixture model. In the video model 120 the templates describe the image, and in the audio model 110 the templates describe the spectrum. In each model, the data are obtained by shifting the original signal, where in the video model 120 the shift is spatial and in the audio model 110 the shift is temporal. Finally, in each model the shifted signal is corrupted by additive noise.

Referring back to FIG. 1, the audio video tracker 130 links the time delay τ between the audio signals of the audio model 110 to the spatial location of the object's image of the video model 120. Further, the audio video tracker 130 provides an output associated with the location of the object.

The audio video tracker 130 thus fuses the audio model 110 and the video model 120 into a single probabilistic graphical model. The audio video tracker 130 can exploit the fact that the relative time delay τ between the microphone signals is related to the object position l. In particular, as the distance of the object from the sensor setup becomes much larger than the distance between the microphones, τ becomes linear in l. Therefore, a linear mapping can be used to approximate this dependence and the approximation error can be modeled by a zero mean Gaussian with precision $v_\tau$, $$p(\tau|l)=N(\tau|\alpha l_x+\alpha' l_y+\beta,v_\tau). \quad (6)$$

Note that the mapping involves the horizontal position, as the vertical movement has a significantly smaller affect on the signal delay due to the horizontal alignment of the microphones (e.g., $\alpha' \approx 0$). The link formed by Eq. (6) fuses the audio model 110 and the video model 120 into a single model.

Figure 6:
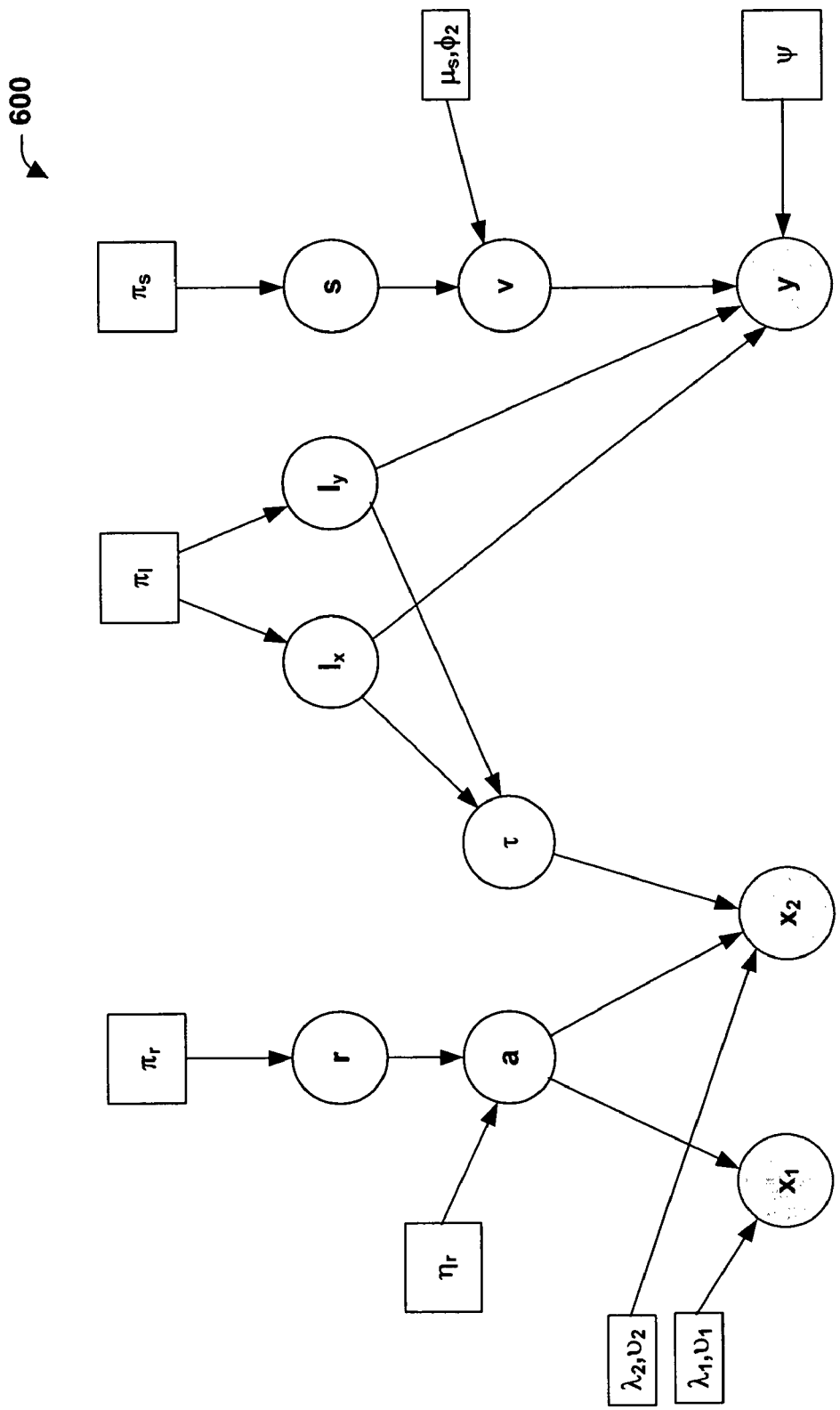
FIG. 6 is a graphical representation of an audio video tracker in accordance with an aspect of the present invention.

Referring to FIG. 6, a graphical representation 600 of the audio video tracker 130 in accordance with an aspect of the present invention is illustrated. The graphical representation 600 includes the observed variables, unobserved variables and model parameters of the audio model 110 and the video model 120. The graphical representation 600 includes a probabilistic conditional dependence of the unobserved time delay parameter τ of the audio model 110 upon the unobserved object positional variables $l_x$ and $l_y$ of the video model 120.

The parameters of the object tracker system 100 can be trained using, for example, variational method(s). In one implementation, an expectation maximization (EM) algorithm is employed.

Generally, an iteration in the EM algorithm consists of an expectation step (or E-step) and a maximization step (or M-step). For each iteration, the algorithm gradually improves the parameterization until convergence. The EM algorithm can be performed as many EM iterations as necessary (e.g., to substantial convergence).

With regard to the object tracker system 100, the E-step of an iteration updates the posterior distribution over the unobserved variables conditioned on the data. The M-step of an iteration updates parameter estimates.

The joint distribution over the variables of the audio video tracker 130 including the observed variables $x_1$, $x_2$, y, the unobserved variables a, τ, r, v, l, s factorizes as:

$$p(x_1,x_2,y,a,\tau,r,v,l,s|\theta)=p(x_1|a)p(x_2|a,\tau)\,p(a|r)\cdot p(r)p \\ (y|v,l)p(v|s)p(s)p(\tau|l)p(l) \quad (7)$$

This is the product of the joint distributions defined by the audio model 110, and the video model 120 as linked by the audio video tracker 130. The parameters of the audio video tracker are:

$$\theta=\{\lambda_1,v_1,\lambda_2,v_2,n_r,\pi_r,\psi,\mu_s,\phi_s,\pi_s,\alpha,\alpha',\beta,v_\tau\}. \quad (8)$$

Ultimately, tracking of the object based on the data is desired, that is, obtaining a position estimate $\hat{l}$ at each frame. In the framework of probabilistic modeling, more than a single value of l is generally computed. Thus, the full posterior distribution over l given the data, $p(l|x_1, x_2, y)$, for each frame, is computed. This distribution provides the most likely position value via $$\hat{l} = \underset{l}{\mathrm{argmax}}\, p(l\mid x_1, x_2, y), \quad (9)$$

as well as a measure of how confident the model is of that value. It can also handle situations where the position is ambiguous (e.g., by exhibiting more than one mode). An example is when the object (e.g., speaker) is occluded by either of two objects. However, in one example, the position posterior is always unimodal.

For the E-step, generally, the posterior distribution over the unobserved variables is computed from the model distribution by Bayes' Rule, $$p(a,\tau,r,v,l,s\mid x_1, x_2, y,\theta) = \frac{p(x_1, x_2, y, a, \tau, r, v, l, s\mid\theta)}{p(x_1, x_2, y\mid\theta)} \quad (10)$$

where $p(x_1, x_2, y|\theta)$ is obtained from the model distribution by marginalizing over the unobserved variables. It can be shown that the posterior distribution of the audio video tracker 130 has a factorized form, as does the distribution of the audio video tracker 130 (Eq. (7)). To describe it, a notation that uses q to denote a posterior distribution conditioned on the data can be used. Hence, $$p(a,\tau,r,v,l,s|x_1,x_2,y,\theta)=q(a|\tau,r)q(v|l,s)q(\tau|l)q(l,r,s). \quad (11)$$

This factorized form follows from the audio video tracker 130. The q notation omits the data, as well as the parameters. Therefore, $q(a|\tau,r)=p(a|\tau, r, x_1, x_2, y, \theta)$, and so on.

The functional forms of the posterior components q also follow from the model distribution. As the model is constructed from Gaussian components tied together by discrete variables, it can be shown that the audio posterior $q(a|\tau, r)$ and the video posterior q(v|l, s) are both Gaussian, $$q(a|\tau)=N(a|\mu_{\tau,r}^a,v_r^a)$$

$$q(v|l,s)=N(v|\mu_{l,s}^v,v_s^v) \quad (12)$$

The means $\mu_{\tau,r}^a$, $\mu_{l,s}^v$ and precisions $V_r^a$, $V_s^v$ are straightforward to compute; note that the precisions do not depend on the shift variables τ, l. One particularly simple way to obtain them is to consider Eq. (11) and observe that its logarithms satisfies:

$$\log p(a,\tau,r,v,l,s|x_1,x_2,y,\theta)=\log(x_1,x_2,y,a,\tau,r,v,l,s|\theta)+ \\ \mathrm{const.} \quad (13)$$

where the constant is independent of the hidden variables. Due to the nature of the model, this logarithm is quadratic in a and v. To find the mean of the posterior over v, the gradient of the log probability with respect to is set to zero. The precision is then given by the negative Hessian, leading to:

$$\mu_{l,s}^v=(v_s^v)^{-1}(\phi_s\mu_s+G_l^T\psi y),$$

$$v_s^v=\phi_s+\psi.$$

Equations for the mean and precision of the posterior over a are obtained in a similar fashion. Another component of the posterior is the conditional probability table $q(\tau|l)=p(\tau|l, x_1, x_2, y, \theta)$, which turns out to be:

$$q(\tau \mid l) \propto p(\tau \mid l) \exp(\lambda_1 \lambda_2 v_1 v_2 (v_r^a)^{-1} c_\tau), \quad (15)$$
where $$c_\tau = \sum_n x_{1,n} x_{2,n+\tau} \quad (16)$$

is the cross-correlation between the audio input signals (e.g., microphone signal) $x_1$ and $x_2$. Finally, the last component of the posterior is the probability table $q(l, r, s)$, whose form is omitted for brevity.

The calculation of $q(\tau|l)$ involves a minor but somewhat subtle point. The delay $\tau$ has generally been regarded as a discrete variable since the object tracker system 100 has been described in discrete time. In particular, $q(\tau|l)$ is a discrete probability table. However, for reasons of mathematical convenience, the model distribution $p(\tau|l)$ (Eq. (6)) treats $\tau$ as continuous. Accordingly, the posterior $q(\tau|l)$ computed by the algorithm of this implementation, is, strictly speaking, an approximation, as the true posterior in this model also treats $\tau$ as continuous. It turns out that this approximation is of the variational type. The rigorous derivation proceeds as follows. First, the form of the approximate posterior as a sum of delta functions is noted to be:

$$q(\tau \mid l) = \sum_n q_n(l) \delta(\tau - \tau_n), \quad (17)$$

where the $\tau_n$ are spaced one time point apart. The coefficients $q_n$ are nonnegative and sum up to one, and their dependence on $l$ is initially unspecified. Next, the $q_n(l)$ is computed by minimizing the Kullback Leibler (KL) distance between the approximate posterior and the true posterior. This produces the optimal approximate posterior out of substantially all possible posteriors which satisfy the restriction of Eq. (17). For ease of notation, $q(\tau|l)$ will be utilized rather than $q_n(l)$.

Next, the M-step performs updates of the model parameters $\theta$ (Eq. (8)). The update rules are derived by considering the objective function:

$$F(\theta) = \langle \log p(x_1, x_2, y, a, \tau, r, v, l, s | \theta) \rangle, \quad (18)$$

known as the averaged complete data likelihood. The notation $\langle . \rangle$ will be used to denote averaging with respect to the posterior (Eq. (11)) over the hidden variables that do not appear on the left hand side and, in addition, averaging over all frames. Hence, F is essentially the log probability of the object tracker system 100 for each frame, where values for the hidden variables are filled in by the posterior distribution for that frame, followed by summing over frames. Each parameter update rule is obtained by setting the derivative of F with respect to that parameter to zero. For the video model 120 parameters $\mu_s, \phi_s, \pi_s$, thus:

$$\mu_s = \frac{\langle \sum_l q(l,s) \mu_{ls}^v \rangle}{\langle q(s) \rangle}, \quad (19)$$

-continued $$\phi_s^{-1} = \frac{\langle \sum_l q(l,s)(\mu_{ls}^v - \mu_s)^2 + q(s)(v_{ls}^v)^{-1} \rangle}{\langle q(s) \rangle}$$

$$\pi^s = \langle q(s) \rangle,$$

where the q's are computed by appropriate marginalizations over $q(l, r, s)$ from the E-step. Notice that here, the notation $\langle . \rangle$ only average over frames. Update rules for the audio model 110 parameters $\eta_r, \pi_r$, are obtained in a similar fashion.

For the audio video link parameters $\alpha, \beta$, for simplicity, it has been assumed that $\alpha'=0$, $$\alpha = \frac{\langle l_x \tau \rangle - \langle \tau \rangle \langle l_x \rangle}{\langle l_x^2 \rangle - \langle l_x \rangle^2} \quad (20)$$

$$\beta = \langle \tau \rangle - \alpha \langle l_x \rangle$$

$$v_\tau^{-1} = \langle \tau^2 \rangle + \alpha^2 \langle l_x^2 \rangle + \beta^2 + 2\alpha\beta\langle l_x \rangle - 2\alpha\langle \tau l_x \rangle - 2\beta\langle \tau \rangle,$$

where in addition to averaging over frames, $\langle . \rangle$ here implies averaging for each frame with respect to $q(\tau, l)$ for that frame, which is obtained by marginalizing $q(\tau|l)q(l, r, s)$ over r, s.

It is to be appreciated that according to Eq. (19), computing the mean $(\mu_s)_n$ for each pixel n requires summing over substantially all possible spatial shifts l. Since the number of possible shifts equals the number of pixels, this seems to imply that the complexity of the algorithm of this implementation is quadratic in the number of pixels N. If that were the case, a standard N=120×160 pixel array would render the computation practically intractable. However, a more careful examination of Eq. (19), in combination with Eq. (14), shows that it can be written in the form of an inverse Fast Fourier Transform (FFT). Consequently, the actual complexity is not $O(N^2)$ but rather $O(N \log N)$. This result, which extends to the corresponding quantities in the audio model 110, significantly increases the efficiency of the EM algorithm of this implementation.

Tracking of the object tracker system 100 is performed as part of the E-step using Eq. (9), where $p(l|x_1, x_2, y)$ is computed from $q(\tau, l)$ above by marginalization. For each frame, the mode of this posterior distribution represents the most likely object position, and the width of the mode a degree of uncertainty in this inference. The object tracker system 100 can provide an output associated with the most likely object position. Further, the object tracker system 100 can be employed, for example, in a video conferencing system and/or a multi-media processing system.

Those skilled in the art will recognize that other variants of the system can be employed in accordance with the present invention and all such variants are intended to fall within the scope of the appended claims. For example, one variant of the system is based on incorporating temporal correlation(s) between the audio-video data, for instance, the location l at time n depends on the location at time n-1, and the speech component r at time n depends on the speech component at time n-1. Another variant is based on the system including a variable for the background image (e.g., the background against which the object is moving), modeling the mean background and its variability.

While FIG. 1 is a block diagram illustrating components for the system 100, it is to be appreciated that the audio model 110, the video model 120 and/or the audio video tracker 130 can be implemented as one or more computer components, as that term is defined herein. Thus, it is to be appreciated that computer executable components operable to implement the audio model 110, the video model 120 and/or the audio video tracker 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 7:
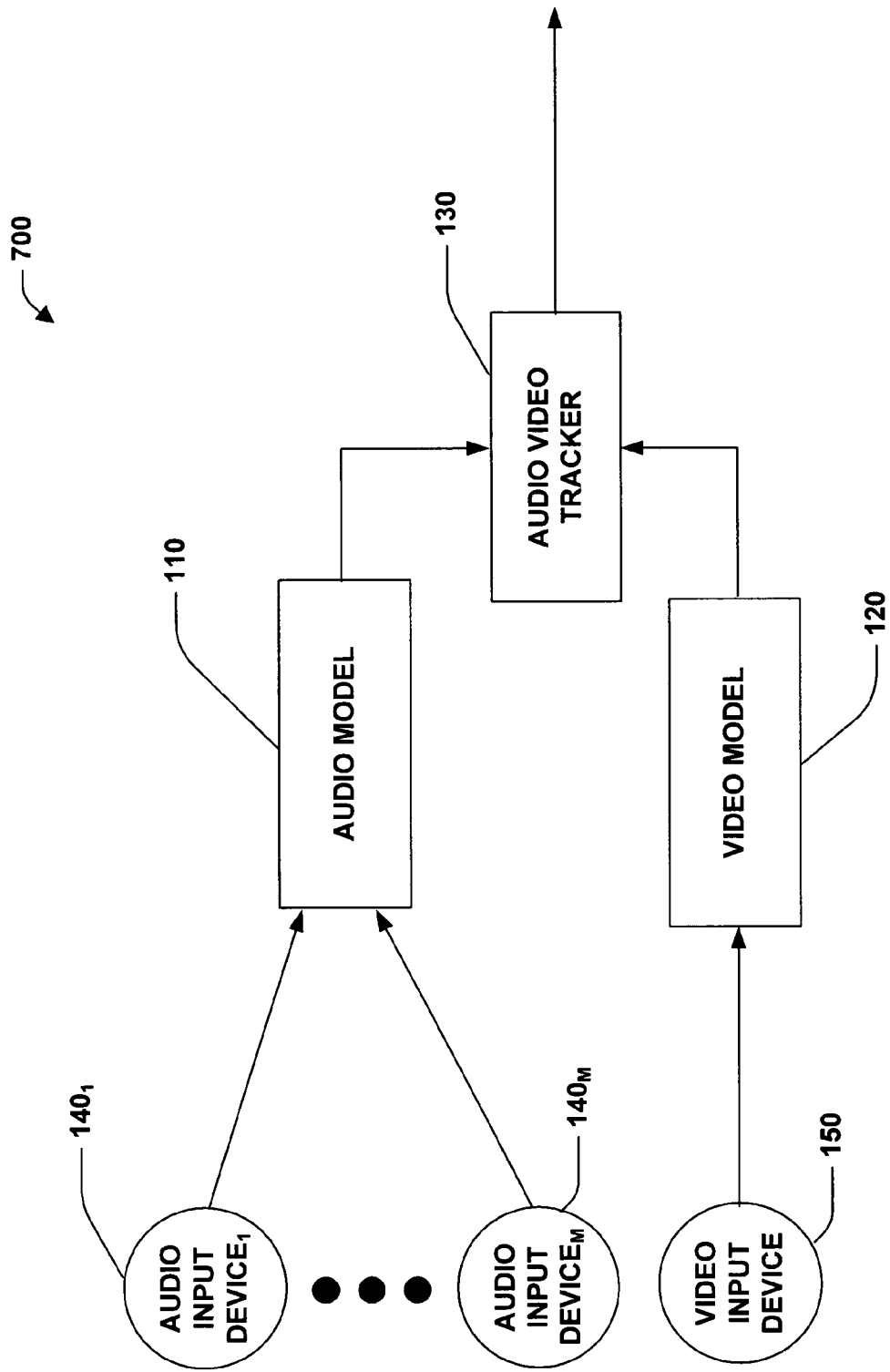
FIG. 7 is a block diagram of an object tracker system in accordance with an aspect of the present invention.

Turning to FIG. 7, an object tracker system 700 includes an audio model 110, a video model 120 and an audio video tracker 130. The system 700 can further include a first audio input device $140_1$ through an Mth audio input device $140_M$, M being an integer greater than or equal to two. The first audio input device $140_1$ through the Mth audio input device $140_M$ can be referred to collectively as the audio input devices 140. Additionally and/or alternatively, the system 700 can further includes a video input device 150.

The audio input devices 140 can be include, for example, a microphone, a telephone and/or a speaker phone. The video input device 150 can include a camera.

Figure 8:
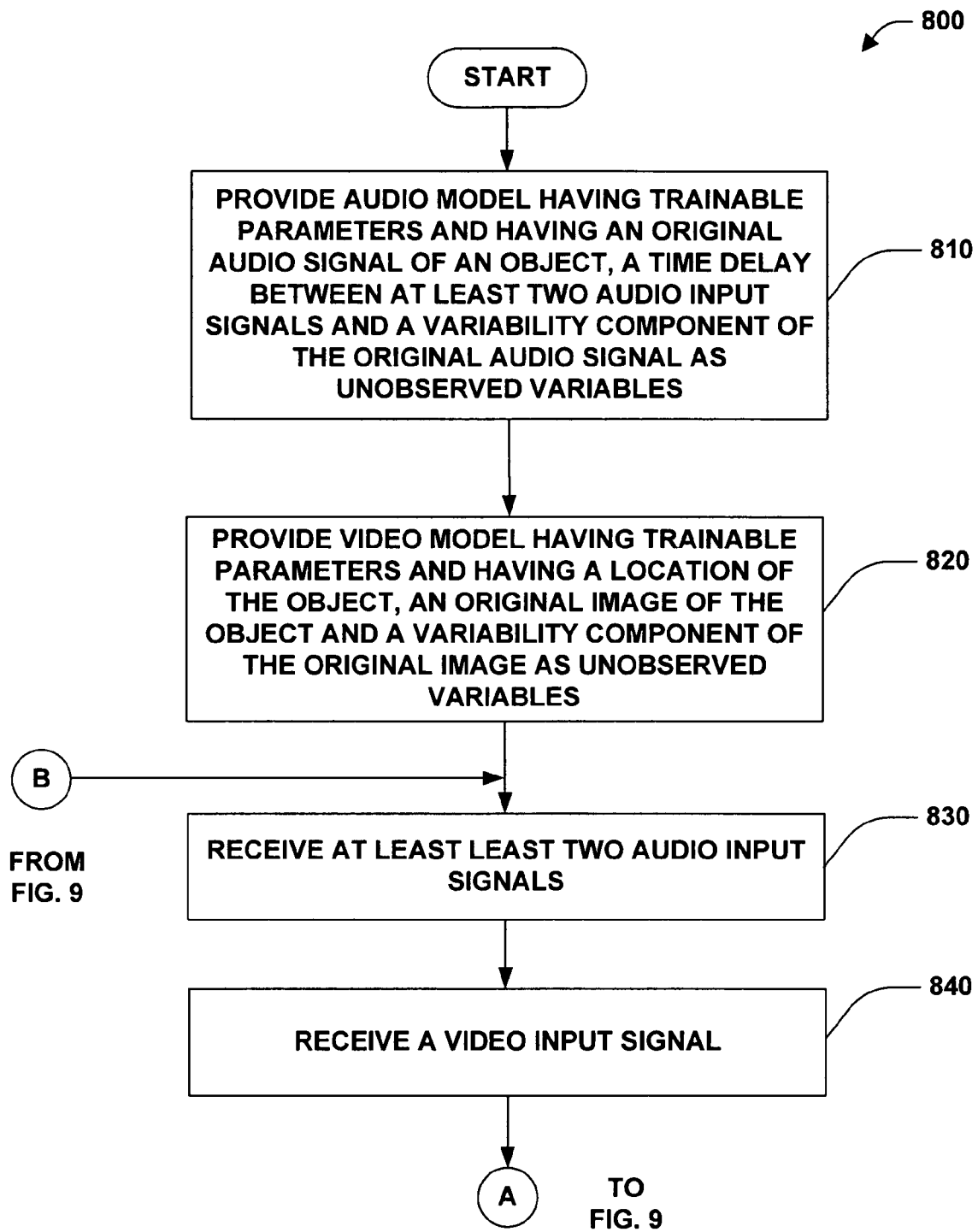
FIG. 8 is a flow chart illustrating a method for object tracking in accordance with an aspect of the present invention.
Figure 9:
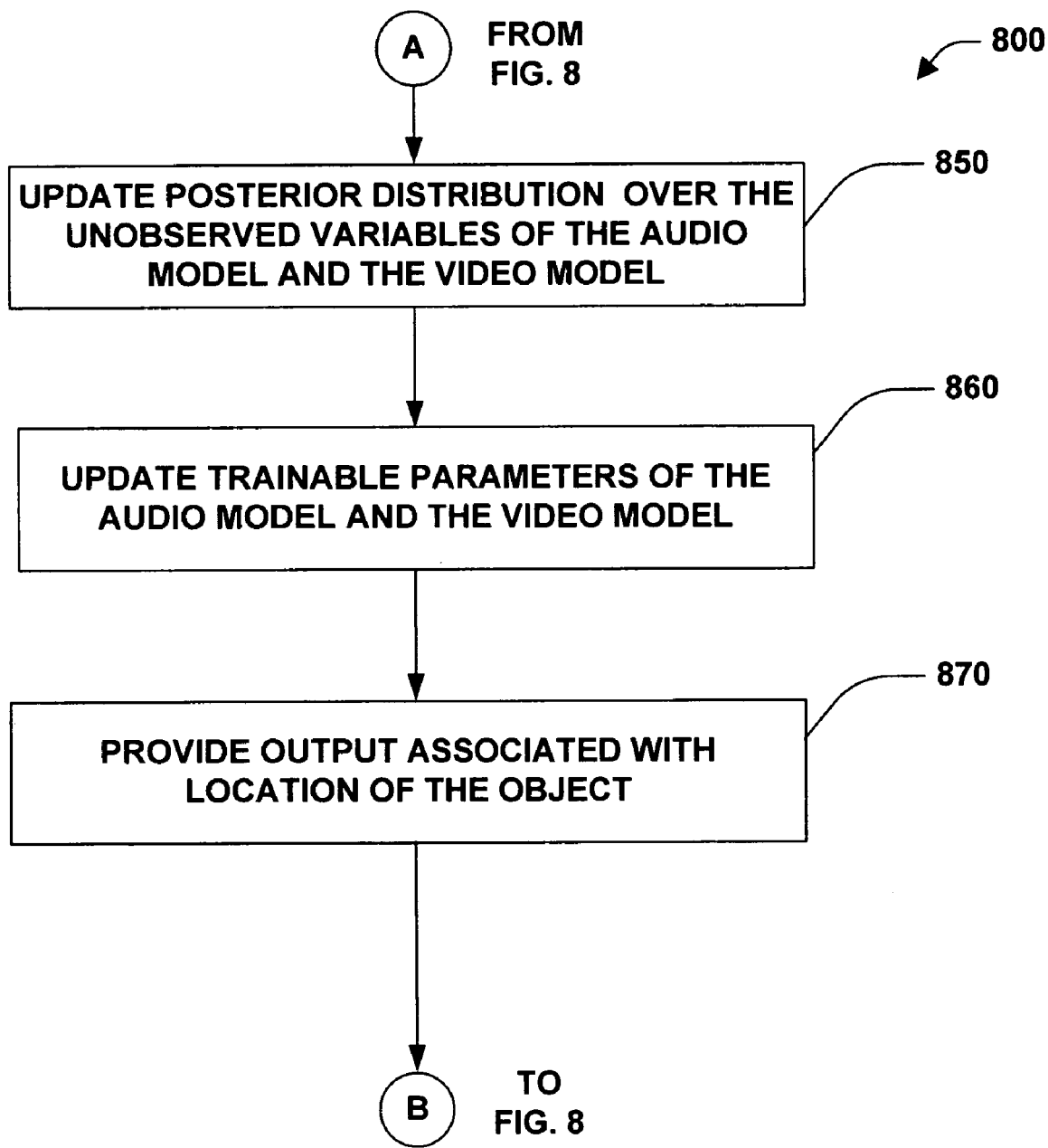
FIG. 9 is a flow chart further illustrating the method of FIG. 8.

In view of the exemplary systems shown and described above, methodologies that may be implemented in accordance with the present invention will be better appreciated with reference to the flow chart of FIGS. 8 and 9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIGS. 8 and 9, a method 800 for object tracking in accordance with an aspect of the present invention is illustrated. At 810, an audio model having trainable parameters, and, an original audio signal of an object, a time delay between at least two audio input signals and a variability component of the original audio signal as unobserved variables is provided. At 820, a video model having trainable parameters, and, a location of the object, an original image of the object and a variability component of the original image as unobserved variables is provided.

At 830, at least two audio input signals are received. At 840, a video input signal is received. At 850, a posterior distribution over the unobserved variables of the audio model and the video model is updated (e.g., based on Eqs. (10)-(17)). At 860, trainable parameters of the audio model and the video model are updated (e.g., based on Eqs. (18)-(20)). At 870, an output associated with the location of the object is provided. Thereafter, processing continues at 830.

Figure 10:
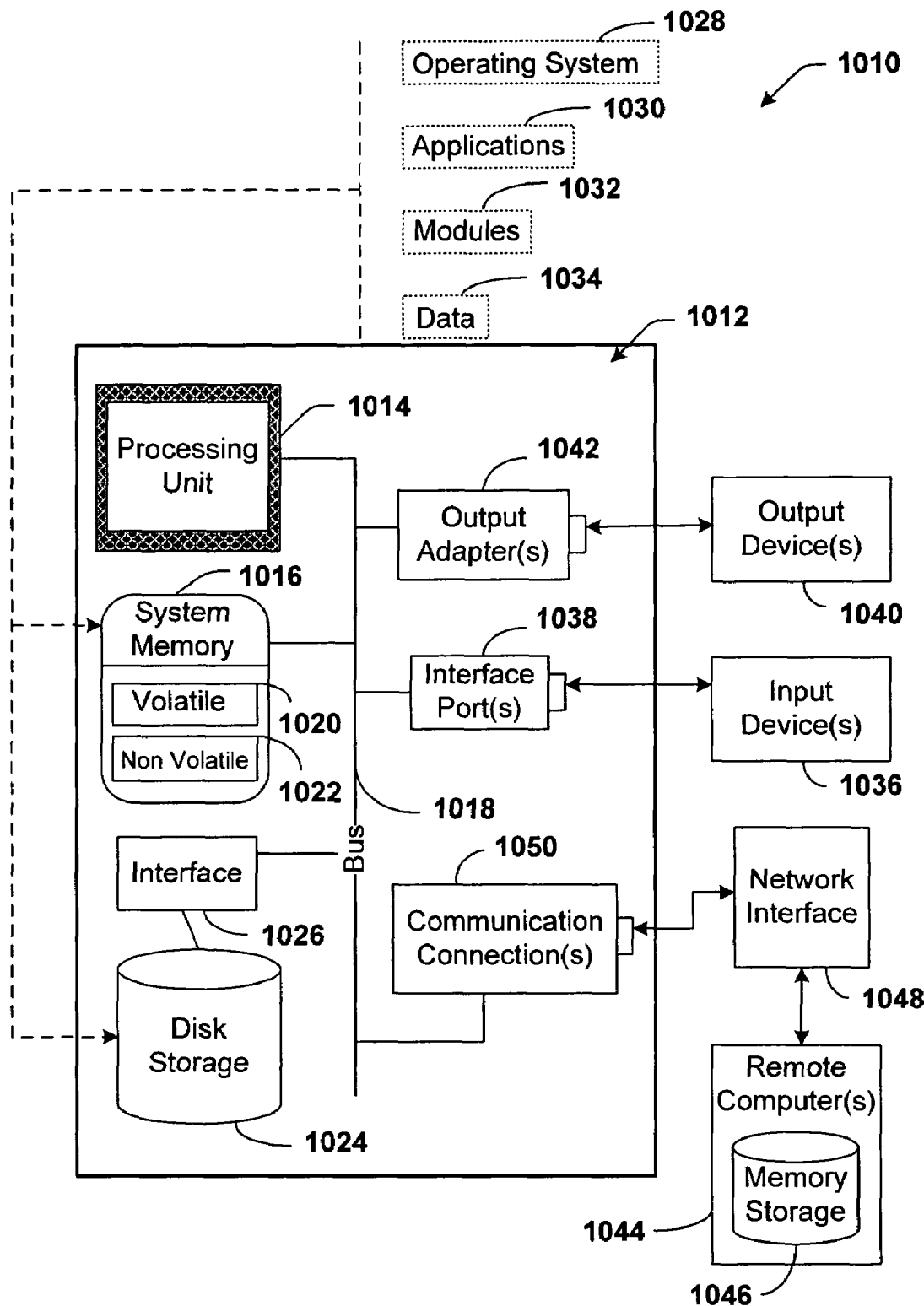
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1002.3, Token Ring/IEEE 1002.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An object tracker system, comprising:
   a processor that executes the following computer executable components stored on a computer readable medium:
   an audio model component that models an original audio signal of an object, a time delay between at least two audio input signals and a variability component of the original audio signal, the audio model employing a probabilistic generative model;
   a video model component that models a location of the object, an original image of the object and a variability component of the original image, the video model employing a probabilistic generative model, the video model receiving a video input; and
   an audio video tracker component that models the location of the object based, at least in part, upon the audio model and the video model, wherein the audio video tracker provides an output associated with the location of the object based on, at least in past, a linear mapping that approximates the location of the object, wherein the linear mapping is computed as a function of the time delay between the at least two audio input signals, wherein error in approximating the location of the object is modeled by a zero mean Gaussian distribution associated with a precision matrix, and wherein the zero mean Gaussian distribution associated with the precision matrix is based on, at least in part:
   a product of a horizontal position of the object and a difference in horizontal position of a first audio input device and a second audio input device;
   a product of a vertical position of the object and a difference in vertical position of the first audio input device and the second audio input device: and
   a precision matrix of an approximation error modeled by a zero mean Gaussian.

2. The system of claim 1, further comprising a video input device.

3. The system of claim 2, wherein the video input device comprises a camera.

4. The system of claim 1, further comprising at least one audio input device.

5. The system of claim 1, wherein the audio input device includes at least one of a microphone, a telephone, or a speaker phone.

6. The system of claim 1, wherein the original audio signal of the object, the time delay between at least two audio input signals, and the variability component of the original audio signal comprise unobserved variables of the audio model; and wherein the audio model further includes trainable parameters.

7. The system of claim 6, wherein the audio video tracker component employs an expectation maximization algorithm to modify the trainable parameters of the audio model.

8. The system of claim 1, wherein the location of the object, the original image of the object, and the variability component of the original image comprise unobserved variables of the video model; and wherein the video model
further includes trainable parameters.

9. The system of claim 8, wherein the audio video tracker component employs an expectation maximization algorithm to modify the trainable parameters of the video model.

10. The system of claim 1, wherein the object is a human speaker.

11. A video conferencing system employing the system of claim 1.

12. A multi-media processing system employing the system of claim 1.

13. The system of claim 1, the audio model employs a hidden Markov model.

14. The system of claim 1, wherein the video model employs a hidden Markov model.

15. The system of claim 1, further comprising a data packet transmitted between two or more computer components that facilitates object tracking including a first data field comprising information associated with a horizontal location of an object and a second data field comprising information associated with a vertical location of the object.

16. One or more processor-accessible storage media comprising processor-executable instructions for object tracking that, when executed, direct a device to perform actions comprising:
    updating a posterior distribution over unobserved variables of an audio model and a video model;
    providing the audio model with trainable parameters and having an original audio signal of the object, a time delay between at least two audio input signals and a variability component of the original audio signal as unobserved variables of the audio model;
    providing the video model with trainable parameters and having the location of the object, an original image of the object and a variability component of the original image as unobserved variables of the video model;
    updating trainable parameters of the audio model and the video model; and
    providing an output associated with a location of an object, wherein the location of the object is based on, at least in part, a linear mapping that approximates the location of the object, wherein the linear mapping is computed as a function of the time delay between the at least two audio input signals, wherein error in approximating the location of the object is modeled by a zero mean Gaussian distribution associated with a precision matrix, and
    wherein the zero mean Gaussian distribution associated with the precision matrix is based on, at least in part:
    a product of a horizontal position of the object and a difference in horizontal position of a first audio input device and a second audio input device;
    a product of a vertical position of the object and a difference in vertical position of the first audio input device and the second audio input device; and
    a precision matrix of an approximation error modeled by a zero mean Gaussian.

17. The one or more processor-accessible storage media method of claim 16, further comprising at least one of the following:
    receiving at least two audio input signals; and
    receiving a video input signal.

18. An object tracker system, comprising:
    means for modeling audio that models an original audio signal of an object, a time delay between at least two audio input signals and a variability component of the original audio signal, the means for modeling audio employing a probabilistic generative model;
    means for modeling video that models a location of the object, an original image of the object and a variability component of the original image, the means for modeling video employing a probabilistic generative model; and
    means for tracking the location of the object based, at least in part, upon the means for modeling audio, the means for modeling video, and means for fusing audio and video models into a single probabilistic graphical model; wherein the means for tracking the location of the object includes means for providing an output associated with the location of the object, wherein the single probabilistic graphical model utilizes a zero mean Gaussian distribution associated with a precision matrix to model error in approximating the location of the object, and wherein the zero mean Gaussian distribution associated with the precision matrix comprises the following equation:

$$p(\tau|l) = N(\tau | \alpha l_x + \alpha' l_y + \beta, \nu_\tau),$$

wherein l is the location of the object,
$l_x$ is a horizontal position of the object,
$l_y$ is a vertical position of the object,
$\tau$ is a time delay between a first audio input signal and a second audio input signal,
$\nu_\tau$ is a precision matrix of an approximation error modeled by a zero mean Gaussian,
$\alpha$ is a horizontal difference in position between a first audio input device and a second audio input device,
$\alpha'$ is a vertical difference in position between the first audio input device and the second audio input device,
$\beta$ is a parameter;
wherein instructions associated with one or more of the above means are executed by a processor operatively coupled to memory.

* * * * *